United States Patent [19]

Eick et al.

[11] Patent Number: 5,000,220

[45] Date of Patent: Mar. 19, 1991

[54] METERING VALVE WITH FOLLOW-UP SERVO

[75] Inventors: Christopher D. Eick, Phoenix; John R. Williamson, Paradise Valley; Paul J. Powers, Glendale, all of Ariz.

[73] Assignee: Allied-Signal Inc., Morris Township, Morris County, N.J.

[21] Appl. No.: 462,356

[22] Filed: Jan. 2, 1990

Related U.S. Application Data

[62] Division of Ser. No. 258,232, Oct. 14, 1988, abandoned.

[51] Int. Cl.⁵ ..................... F16K 31/04; F16K 31/42
[52] U.S. Cl. .................. 137/501; 251/30.03; 251/129.05; 251/38
[58] Field of Search .............. 251/129.05, 38, 30.03, 251/30.01; 137/625.64, 625.61, 501

[56] References Cited

U.S. PATENT DOCUMENTS

| | | |
|---|---|---|
| 3,023,996 | 3/1962 | Robertson ..................... 251/38 X |
| 3,391,289 | 7/1968 | Danilewicz et al. . |
| 3,488,030 | 1/1970 | Hulme et al. . |
| 3,596,677 | 8/1971 | Clark ........................ 137/501 |
| 3,667,722 | 6/1972 | Katz et al. .................. 251/38 X |
| 3,894,275 | 7/1975 | Baumans et al. . |
| 4,145,956 | 3/1979 | Rumrill, Jr. et al. ......... 137/625.64 |
| 4,154,425 | 5/1979 | Smith . |
| 4,193,421 | 3/1980 | Sakakibara et al. . |
| 4,313,468 | 2/1982 | Patel ..................... 137/625.61 |
| 4,318,869 | 3/1982 | Stoltman . |
| 4,462,566 | 7/1984 | French ................... 137/501 X |
| 4,483,369 | 11/1984 | Akagi et al. . |
| 4,545,117 | 10/1985 | Okamoto . |
| 4,576,200 | 3/1986 | Janecke et al. ......... 137/625.64 X |
| 4,585,206 | 4/1986 | Itoh . |
| 4,640,093 | 2/1987 | Eastman . |
| 4,660,586 | 4/1987 | Knapp et al. . |
| 4,689,529 | 8/1987 | Higuichi . |
| 4,779,648 | 10/1988 | Sloate ................... 137/625.64 |

Primary Examiner—Arnold Rosenthal
Attorney, Agent, or Firm—Joseph R. Black; James W. McFarland; Robert A. Walsh

[57] ABSTRACT

A metering valve (10) having a bi-directional motor (11) with a linearly-displaceable output shaft (21) in which the shaft (21) is separated from but cooperates with a bi-directionally movable piston (16) to provide a variable flow aperture (102) in a secondary flow path (12,52,74,78,76,102,100,48) extending axially through the piston (16). Flow along a primary flow path (12,18,48,14) is varied by movement of the piston (16) in response to an imbalance of opposing hydraulic forces. The imbalance in forces results from varying the foresaid flow aperture (102) by displacing the output shaft (21). However, the flow aperture (102) is only transitorily varied by displacement of the shaft (21) since the valve (10) is designed to provide a follow-up servo function by which the piston (16) is kept at a substantially constant distance from the shaft (21).

4 Claims, 1 Drawing Sheet

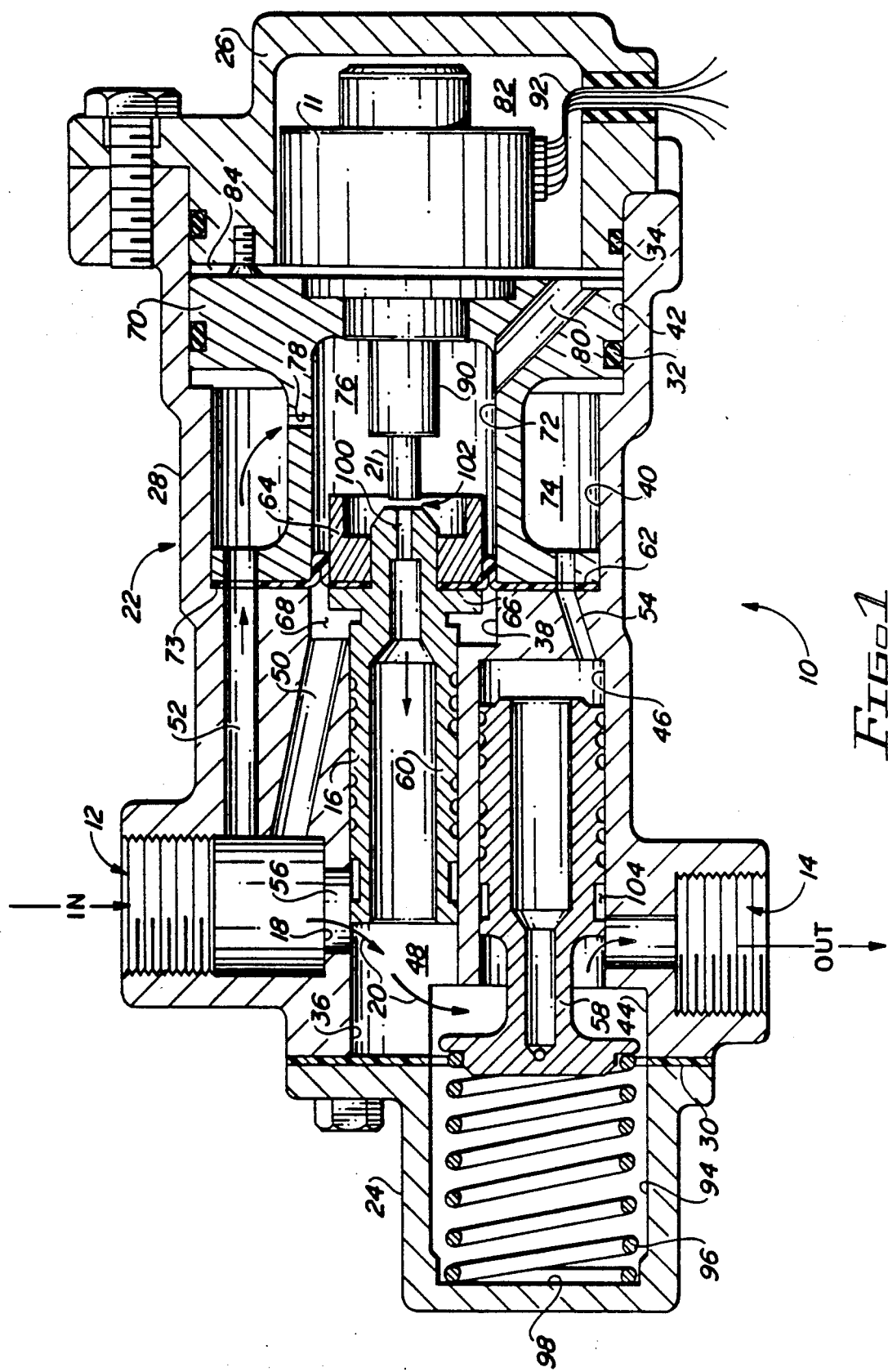

METERING VALVE WITH FOLLOW-UP SERVO

This application is a division of application Ser. No. 258,232 filed Oct. 14, 1988, now abandoned.

TECHNICAL FIELD

The present invention relates generally to valves used in metering the flow of a fluid between a centrifugal pump and a load, and more particularly to electrohydraulic metering valves which employ hydraulic means for variably blocking a flow path in response to electrical input signals.

BACKGROUND OF THE INVENTION

Electrohydraulic metering valves have typically employed solenoids to control the size of a variable aperture in proportion to the magnitude of the signal applied to the solenoid. In some schemes (See, e.g. U.S. Pat. No. 4,585,206 Itoh), the size of the aperture is controlled by application of mechanical force to a metering element, the force being directly applied by an output shaft of the solenoid. Such valves have power requirements that are undesirably high in applications such as single-mission vehicles wherein weight and power economy are key design considerations. Moreover, such valves typically have relatively low metering resolution due to limitations in the practicable stroke of the output shaft. Metering valves have been developed in which fuel flow is controlled by varying the size of an aperture in response to an imbalance of hydraulic forces, wherein the imbalance is effected by changing the input signal to a solenoid (See, e.g. U.S. Pat. No. 4,640,093 Eastman). However, these valves also have high power requirements in comparison to the present invention, one reason being that they require continual application of electrical energy in order to maintain a given flow rate.

Accordingly, an objective of the present invention is to provide a metering valve having low power requirements and relatively high metering resolution. Further objectives and advantages of the invention will be apparent from the following description including the appended claims, when read in conjunction with the accompanying drawing.

SUMMARY OF THE INVENTION

This invention provides a metering valve in which the output shaft of a bi-directional linear step motor cooperates with a metering piston which has a longitudinally extending bore in order to provide a variable flow aperture, and therefore variable flow restriction, along a secondary flow path which includes the foresaid bore. Fluid flow from the inlet to the outlet of the valve is varied by displacing the output shaft in response to electrical signals communicated to the motor. Displacement of the shaft effects a temporary variation in flow restriction through the variable flow aperture, which in turn effects a temporary imbalance of opposing hydraulic forces acting on the metering piston. This imbalance causes the piston to move in a direction and over a distance corresponding to the displacement of the output shaft so that flow restriction through the variable flow aperture is restored to the degree thereof which prevailed prior to displacement of the shaft. The movement of the metering piston is used to vary the degree to which an orifice in a primary flow path is blocked, thus providing the metering function of the valve. A throttling piston is used to maintain a substantially constant pressure drop across the orifice. By the above-described functional arrangement, the invention provides a metering valve having fast response time, high metering resolution, and low power requirements. Since no movement occurs without an imbalance of the foresaid hydraulic forces, and since there is no imbalance when the output shaft is separated from the metering piston by a certain distance (i.e., the variable flow aperture is providing a certain degree of flow restriction along the secondary flow path), the valve requires no electrical energy in order to maintain a given rate of flow from the inlet to the outlet.

BRIEF DESCRIPTION OF THE DRAWING

FIG. 1 is a cross-sectional drawing of a fuel metering valve in accordance with the preferred embodiment of the invention.

DESCRIPTION OF THE PREFERRED EMBODIMENT

Referring to the drawing, the numeral (10) designates a metering valve preferably employed as the metering component of a fuel flow control system (not shown) in a single-mission vehicle (not shown) such as a guided missile. Typically, the operating conditions of an engine (not shown) in the vehicle are indicated by data communicated from a plurality of sensors (not shown). These sensor data are received by an engine controller (not shown) and processed according to program instructions written to compute fuel intake demand for the engine. Any required change in fuel flow is then communicated via electrical signals from the engine controller to a linear step motor (11) in the metering valve (10).

The fuel is received in an inlet (12) from a centrifugal pump (not shown) and metered for delivery through an outlet (14). Metering is accomplished by positioning a generally cylindrical metering piston (16) with respect to an orifice (18) through which fuel passes in flowing from the inlet (12) to the outlet (14) along a primary flow path (indicated by arrows (20)). The metering piston (16) maintains a given position until the output shaft (21) of the motor (11) is displaced in response to electrical signals received from the engine controller, as is further explained below.

The metering valve (10) has an encasement (22) comprising first and second end sections (24,26) secured to a middle section (28) and having suitable sealing elements (30,32,34). The middle section (28) defines a first stepped bore having first, second, third, and fourth portions (36,38,40,42) of successively larger diameter, and a second stepped bore having first and second portions (44,46) of successively smaller diameter. The first portion (36) cooperates with the metering piston (16) to define a first pressure chamber (48). The middle section (28) further defines first and second channels (50,52) providing fluid communication between the inlet (12) and the second and third portions (38,40) of the first stepped bore, a third channel (54) providing fluid communication between the third portion (40) of the first stepped bore and the second portion (46) of the second stepped bore, and a generally rectangular channel (56) extending from the inlet (12) to the first portion (36) to define the foresaid orifice (18). The nominal dimension of the channel (56) in the direction of displacement of the output shaft (21) corresponds to the stroke of the shaft. The first portions (36,44) of each stepped bore overlap as indicated to provide fluid communication from the first pressure chamber (48) to the outlet (14). Slidably disposed in the second portion (38) of the second stepped bore is a throttling piston (58).

The metering piston (16) defines a stepped bore (60) extending axially therethrough. A portion of the metering piston (16) extends through a hole in a circular diaphragm (62). The diaphragm (62) is secured by a retainer (64) which is pressed onto the metering piston (16) and limited by a collar portion (66) of the piston which is nominally of the same diameter as the retainer, so that the diaphragm is sandwiched therebetween. The diaphragm (62) has two peripheral cut-outs to accommodate flow along channels (52) and (54). The metering piston (16) is slidably disposed in the first portion (36) of the first stepped bore as indicated and cooperates with the diaphragm (62) and middle section (28) to define a generally annular second pressure chamber (68).

A toroidal member (70) having an axially extending stepped bore (72) is received in the third and fourth portions (40,42) of the first stepped bore and bears against the diaphragm (62) which in turn bears against an annular land (73) formed in the middle section (28). Accordingly, a generally annular cavity (74) and a third pressure chamber (76) are defined. The member (70) further defines a throughhole (78) providing fluid communication from the annular cavity (74) to the third pressure chamber (76), and a channel (80) providing fluid communication between the third pressure chamber and a cylindrical cavity (82) formed in the second end section (26) of the encasement (22).

A plate (84) secured to the housing of the linear step motor (11) is in turn secured to the second end section (26). The motor (11) is received in the cylindrical cavity (82) while the output shaft (21) and shaft guide (90) extend via the stepped bore (72) into the third pressure chamber (76) so that the output shaft is coaxial with the metering piston (16). A bore (92) extending from the outer surface of the encasement (22) to the cavity (82) provides a conduit for electrical communication to the motor (11), and is sealed by suitable means (not shown) to prevent leakage of fuel from the cavity.

The first end section (24) defines a bore (94) aligned with and having the same diameter as the first portion (44) of the second stepped bore formed in the middle section (28). Received within the bore (94) is a spring (96) which preloads the throttling piston (58). It will be recognized that the purpose of the throttling piston (58) is to provide a substantially constant difference between P1 and P2. Alternatively, the valve (10) can be operated without the throttling piston (58) by providing appropriate data and appropriate software in the engine controller. Shims (not shown) may be inserted between the spring (96) and the flat surface (98) defined by the bore (94) to provide the appropriate preload for the piston (58). Annular recesses (as at (104)) are formed in both the throttling piston (58) and the metering piston (16) in order to provide stability.

In operation of the metering valve (10), fuel entering the inlet (12) pressurizes the second pressure chamber (68) at inlet pressure. A secondary flow path is defined from the second channel (52), to the annular cavity (74), through the through-hole (78), to the third pressure chamber (76), and to the first pressure chamber (48) via the stepped bore formed in the metering piston (16). Fuel which flows along the primary or secondary flow paths undergoes a drop in pressure in passing through the orifice (18) or the through-hole (78), respectively. Letting "P1", "P2", and "P3" represent the fuel pressures in the first, second, and third pressure chambers (48,68,76), and letting "A1" and "A2" represent the cross-sectional areas of the metering piston (16) (less the area of the smaller-diameter portion (100) of its stepped bore) and the second portion (38) of the first stepped bore formed in the middle section (28), it is apparent that the metering piston is stationary when the product P3*A2 equals the sum of products P1*A1 and P2*(A2-A1). This steady-state condition obtains when the output shaft (21) and the metering piston (16) are separated by a certain distance. The output shaft (21) cooperates with the metering piston (16) to define along the secondary flow path an essentially annular flow aperture (102) through which fuel flows from the third pressure chamber (76) to the stepped bore (60) formed in the piston.

When more or less fuel flow is dictated, P3 is temporarily changed by changing the position of the output shaft (21). When flow through the annular flow aperture (102) is restricted to a lesser extent by displacing the shaft (21) to the right (as viewed in FIG. 1), P3 decreases and becomes closer in magnitude to P1, while P1 temporarily increases. Consequently, the metering piston (16) moves toward the third pressure chamber (76), thus restricting primary flow to a lesser degree, until the steady-state distance between the piston and the output shaft (21) is restored, at which time P1 and P3 are restored to their steady-state magnitudes. Conversely, as the area of the flow aperture (102) is further restricted by movement of the shaft (21) to the left, P3 increases and becomes closer in magnitude to P2, while P1 temporarily decreases. Consequently, the metering piston (16) moves away from the third pressure chamber (76), thus restricting primary flow to a greater degree, until the steady-state distance between the piston and the output shaft (21) is restored, at which time P1 and P3 are restored to their steady-state magnitudes.

The metering piston (16) moves very rapidly in response to the imbalance of hydraulic forces resulting from movement of the output shaft (12). Accordingly, the distance between the piston (16) and the shaft (21) is maintained substantially constant except for fleeting deviations attributable to the response time of the metering valve (10).

Since the metering piston (16) moves in each direction in response to an imbalance of hydraulic forces the metering valve (10) can be operated with low power requirement than would obtain if the shaft (21) moved the piston by contact therewith. In an already-constructed prototype of the valve (10), satisfactory results have been demonstrated using a linear step motor purchased from Haydon Switch and Instrument, Inc. of Waterbury, Conn. The motor has a power consumption of 3.5 watts, weighs 1.5 ounces, has an operating potential of 12 volts, moves one thousandth of an inch per step, and moves 200 steps per second at one pound of force. The steady-state distance of separation between the output shaft (21) and metering piston (16) was approximately two thousandths of an inch. It will be recognized that since the metering piston (16) follows the linear movement of the output shaft (21), the steady-state distance between the shaft and the piston is substantially independent of the position of the metering piston with respect to the orifice (18), and since the motor (11) requires no energy to maintain a position already assumed by the shaft (21), no power is required during periods when fuel demand is constant.

Having described the invention, it should be understood that the description is illustrative rather than restrictive, and that no limitations on the scope of the invention are to be inferred from the design details of the preferred embodiment except as is consistent with the following claims and their equivalents.

What is claimed is:

1. A metering valve having an inlet, an outlet, and an internal pressure chamber in fluid communication with said inlet and outlet, said valve comprising:

a generally cylindrical member slidably disposed in a bore to restrict flow along a primary flow path to a greater or lesser degree depending upon its position in said bore, said member defining a stepped bore extending axially therethrough, said position depending in part on fluid pressure in said internal chamber and in part on fluid pressure at said inlet;

a linear stepping motor having a linearly displaceable output shaft, said shaft being coaxial with said member whereby a distal end of said shaft cooperates with an end of said member in order to define a variable flow restriction along a secondary flow path extending through said stepped bore, said motor being operable in response to electrical energy to displace said shaft in each of two opposite directions in order to vary said variable flow restriction, said motor being operative when said energy is discontinued to maintain a position assumed by said shaft; and mean, independent on application of mechanical force by said shaft, for producing a hydraulic response to displacement of said shaft such that said member is moved in one axial direction thereof when said shaft is displaced in one of said two opposite directions, and in an opposite axial direction thereof when said shaft is displaced in the other of said two opposite directions, said producing means being operable to maintain said member at a distance from said shaft which is substantially constant except during transitory periods associated with displacement of said shaft, said producing means also being operable to maintain a substantially constant difference between fluid pressure at said inlet and fluid pressure in said internal chamber.

2. A metering valve as in claim 1 wherein said primary flow path intersects said bore to include a portion thereof.

3. A metering valve as in claim 1 wherein said producing means defines first, second, and third pressure chambers including said internal chamber for receiving pressurized fluid wherein fluid in said first and second chambers exerts a force tending to move said member toward said shaft and fluid in said third chamber exerts an opposing force tending to move said member away from said shaft.

4. A metering valve as in claim 2 wherein said opposing force varies inversely with said distance.

* * * * *